(12) United States Patent
Schörkhuber (10) Patent No.: US 10,315,768 B2
(45) Date of Patent: Jun. 11, 2019

(54) OVERHEAD LUGGAGE COMPARTMENT FOR AN AIRCRAFT

(71) Applicant: FACC AG, Ried im Innkreis (AT)

(72) Inventor: Jakob Schörkhuber, Geboltskirchen (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 15/772,966

(22) PCT Filed: Nov. 3, 2016

(86) PCT No.: PCT/AT2016/060097
§ 371 (c)(1),
(2) Date: May 2, 2018

(87) PCT Pub. No.: WO2017/075640
PCT Pub. Date: May 11, 2017

(65) Prior Publication Data
US 2018/0319501 A1    Nov. 8, 2018

(30) Foreign Application Priority Data

Nov. 3, 2015   (AT) .............................. A 50929/2015

(51) Int. Cl.
*B64D 11/00*     (2006.01)
*E05F 3/10*     (2006.01)
(Continued)

(52) U.S. Cl.
CPC .............. *B64D 11/003* (2013.01); *E05F 3/10* (2013.01); *E05F 3/22* (2013.01); *E05F 1/10* (2013.01);
(Continued)

(58) Field of Classification Search
CPC . B64D 11/003; E05F 3/10; E05F 3/22; E05Y 2900/538
See application file for complete search history.

(56) References Cited

U.S. PATENT DOCUMENTS 5,244,269 A    9/1993   Harriehausen et al.
7,258,406 B2   8/2007   Stephan et al.
(Continued)

FOREIGN PATENT DOCUMENTS

AT    410536 B    5/2003
AT    413812 B    6/2006
(Continued)

OTHER PUBLICATIONS

ISA European Patent Office, International Search Report Issued in Application No. PCT/AT2016/060097, dated Feb. 1, 2017, WIPO, 6 pages.
(Continued)

*Primary Examiner* — Timothy D Collins
*Assistant Examiner* — Tye William Abell
(74) *Attorney, Agent, or Firm* — McCoy Russell LLP (57) ABSTRACT

The invention relates to an overhead luggage compartment for an aircraft, comprising an upper luggage compartment element, a lower luggage compartment element movable between a locked and an open position, a holding device for holding the lower luggage compartment element in the closed position, a lifting spring for supporting the movement of the lower luggage compartment element from the open position to the closed position, and a retaining device for fixing the lifting spring in the tensioned state in the open position of the lower luggage compartment element. An operating handle for releasing the retaining device in the open position of the lower luggage compartment element is provided, wherein the lower luggage compartment element
(Continued)

is movable, optionally with support by the lifting spring or with the lifting spring fixed in a tensioned state, from the open position to the closed position.

21 Claims, 9 Drawing Sheets

(51) Int. Cl.
  *E05F 3/22* (2006.01)
  *E05F 1/10* (2006.01)
(52) U.S. Cl.
  CPC .......... *E05F 1/1058* (2013.01); *E05F 1/1091* (2013.01); *E05Y 2201/62* (2013.01); *E05Y 2800/21* (2013.01); *E05Y 2800/22* (2013.01); *E05Y 2800/242* (2013.01); *E05Y 2900/502* (2013.01); *E05Y 2900/538* (2013.01); *Y02T 50/46* (2013.01)

(56) References Cited

U.S. PATENT DOCUMENTS

| | | | |
|---|---|---|---|
| 8,770,515 | B1 | 7/2014 | Cloud et al. |
| 9,205,924 | B2 | 12/2015 | Geng |
| 2002/0175244 | A1 | 11/2002 | Burrows et al. |
| 2004/0016847 | A1* | 1/2004 | Ritts .................. B64D 11/003 244/118.5 |
| 2007/0095979 | A1* | 5/2007 | Ritts .................. B64D 11/003 244/118.1 |
| 2008/0073462 | A1* | 3/2008 | Wolf .................. B64D 11/003 244/118.1 |
| 2009/0079215 | A1* | 3/2009 | Shirase .................. E05F 1/10 296/37.12 |
| 2011/0253714 | A1 | 10/2011 | Ivester et al. |
| 2014/0283336 | A1* | 9/2014 | Cloud .................. G05G 17/00 16/72 |
| 2016/0229537 | A1* | 8/2016 | Scown .................. B64F 5/00 |

FOREIGN PATENT DOCUMENTS

| | | |
|---|---|---|
| CN | 101039821 A | 9/2007 |
| CN | 105775138 A | 7/2016 |
| DE | 4130644 A1 | 3/1993 |
| DE | 4335151 A1 | 4/1995 |
| DE | 102006045189 A1 | 4/2008 |
| DE | 102013003364 A1 | 9/2014 |
| WO | 03033346 A1 | 4/2003 |

OTHER PUBLICATIONS

State Intellectual Property Office of the People's Republic of China, Office Action and Search Report Issued in Application No. 201680070881.1, Jan. 3, 2019, 19 pages.

* cited by examiner

OVERHEAD LUGGAGE COMPARTMENT FOR AN AIRCRAFT

CROSS-REFERENCE TO RELATED APPLICATIONS

The present application is a U.S. National Phase of International Patent Application Serial No. PCT/AT2016/060097 entitled "OVERHEAD LUGGAGE COMPARTMENT FOR AN AIRCRAFT," filed on Nov. 3, 2016. International Patent Application Serial No. PCT/AT2016/060097 claims priority to Austrian Patent Application No. A 50929/2015, filed on Nov. 3, 2015. The entire contents of each of the above-cited applications are hereby incorporated by reference in their entirety for all purposes.

TECHNICAL FIELD

The invention relates to an overhead luggage compartment for an aircraft, comprising: an upper luggage compartment element, a lower luggage compartment element which is movable between an open position and a closed position, a holding device for holding the lower luggage compartment element in its closed position, a lifting spring for supporting the movement of the lower luggage compartment from the open position to the closed position, and a retaining device for fixing the lifting spring in the tensioned state in the open position of the lower luggage compartment.

BACKGROUND

Luggage compartments have been known in the prior art for a long time. Such overhead luggage compartments often include a locking mechanism, by means of which the movable part of the luggage compartment can be fixed in its closed position. To facilitate closing of the luggage compartment, lifting springs may be provided. The lifting springs are biased upon opening of the luggage compartment, so that the stored spring energy is available for the closing operation. Usually, the spring force of the lifting springs has been designed to the unloaded state of the luggage compartment. Thus, the luggage compartment itself remains in the open position even when the luggage compartment is not loaded with pieces of luggage.

In addition, luggage compartments are known in the prior art, in which additional spring elements can be connected, depending on the load condition of the luggage compartment.

Austrian patent AT 410 536 B shows a suspension device for lowerable luggage rack containers in which a device for detecting the weight of the container is arranged on the container so that an additional spring element can be connected depending on the weight of the container. The additional spring element is fixed by a retaining device in the form of a movable hook until the container is loaded with luggage. This causes the container to sink downwards against the spring force of a measuring spring, while releasing the hook via a Bowden cable, by means of which a sleeve of the spring element is held back. In addition to the coil spring, the additional spring element can thus support the movement of the container into the closed position even when fully loaded. Accordingly, this known embodiment refers to a weight-dependent support of the closing process.

However, as a disadvantage, the user cannot influence whether the additional spring support is released for the closing process. The inclusion of the additional spring element solely depends on the load condition of the luggage rack container. In addition, this prior art requires a complex mechanical system to record the load condition, i. e. to weigh the luggage compartment. In addition, it constitutes a disadvantage that a fixed limit value has been specified up to which the closing process is not supported.

AT 413 812 B discloses another version of a lowerable luggage rack container, in which a shifting gate is arranged on the side wall of the lowerable container, which in the open position of the luggage rack container interacts with a switch lever of the spring element in order to effect a change-over of the spring element depending on the weight of the container. The shifting gate is moved depending on the weight-related change in the position of the container. In the case of a moderately loaded container, it is moved downwards against the force of the measuring spring. As a result, the shifting gate also carries out a corresponding movement, so that the shift lever is positioned on the lower level of the shifting gate and thus causes a rotational movement of a disk connected to the shift lever. This releases the spring element, which can therefore exert its force during the closing process. In the case of such a moderate loading of the container only the larger spring element is effective. When the container is fully loaded, the switch lever is positioned on the lowest stage of the shifting gate, so that the disk rotates further. This releases both the sleeve of the spring element and the spring element, so that both spring elements can exert their force. Prior art AT 413 812 B also proposed another embodiment in which the spring support of the closing process depends on the load condition. This embodiment has the same disadvantages as patent AT 410 536 B discussed above.

In addition, it is known from WO 03/033346 A1 that a luggage compartment can be equipped with a device for holding the container in its open position. Said device is formed by a resiliently mounted ball engaging in a corresponding detent recess in the open position of the container. This enables the container to be held in its open position for loading, thus making handling easier. In such an embodiment, stronger lifting springs might also be used. However, it is a disadvantage that the spring force pressing the ball into the detent recess needs to be at least large enough to prevent it from being overcome by the force of the lifting spring. As a result, a comparatively large operating force is required to close the luggage compartment.

US 2011253714 A1 discloses a lifting device that supports the closing of a luggage compartment by spring force. The lifting device comprises a spring connected to a rod. The one end of the spring is attached to a fixed part of the luggage compartment, the other end of the rod is connected to a movable part of the luggage compartment. The well-known device also features a blocking device which blocks the movement of the rod in a locked state and releases it in an unlocked state. When the movable component of the luggage compartment is opened, the spring is tensioned, which can be held in the tensioned position by the blocking device. The blocking device comprises a magnet to actuate a pawl interacting with the rod. The magnet can be activated by pressing a push button, so that the closing process is supported by spring force. If the push button is not pressed, the spring remains tensioned and the luggage compartment can be closed without spring-force support. In addition, a retainer sleeve is provided to ensure that the pawl can only be unlocked in the open position and in the loaded state at the touch of a button. In this prior art, the spring force support can only be released by loading the luggage compartment. In the unloaded state, the spring remains biased by the blocking device and the closing process is not supported.

DE 102013003364 A1 discloses a force supporting device for a luggage compartment comprising a lowerable tray. The force support upon closing of the tray is effected by a spring, which supports the closing process starting from a certain loading weight of the tray by means of spring force. In the inactive state, the spring is fixed by means of locking elements. Accordingly, this prior art only refers to a different weighing system.

Accordingly, the object of the present invention is to eliminate or at least alleviate the disadvantages of the prior art. The invention is therefore aimed in particular at providing an overhead luggage compartment of the type mentioned at the outset, in which the closing process can be supported by spring force, without making it considerably more difficult to initiate the closing process at the beginning.

Said object is achieved by an overhead luggage compartment for an aircraft, comprising an upper luggage compartment element, a lower luggage compartment element which is movable between an open position and a closed position, comprising a holding device for holding the lower luggage compartment element in its closed position, comprising a lifting spring for supporting the movement of the lower luggage compartment element from the open position into the closed position, and comprising a retaining device for fixing the lifting spring in the tensioned state in the open position of the lower luggage compartment element, characterized in that an operating handle is provided to release the retaining device in the open position of the lower luggage compartment element, wherein the lower luggage compartment element is movable, optionally with support by the lifting spring or with the lifting spring fixed in the tensioned state, from the open position toward the closed position.

According to the invention, an operating handle is provided to release the retaining device in the open position of the lower luggage compartment element, wherein independently of its load condition the lower luggage compartment element is movable from the open position to the closed position either with the support of the lifting spring or with the lifting spring fixed in the tensioned state.

In order to release the support of the closing operation by the lifting spring, the user can, in the open position of the luggage compartment, move the retaining device from a holding position, i. e. an active state, to a release position, i. e. an inactive state, by means of the operating handle. In the release position of the retaining device the lifting spring is released, so that the lifting spring can unbend during the movement of the lower luggage compartment element from the open position to the closed position. This facilitates the closing process. The retaining device is also designed in such a way that the movement of the lower luggage compartment element from the closed position toward the open position in the non-actuated state of the operating handle can be effected without the support by the lifting spring, i. e. in the tensioned state of the lifting spring.

The user may carry out the closing process independently of the load condition of the lower luggage compartment element, either with or without the support of the lifting spring. For example, to close an unloaded luggage compartment, it is not necessary to release the lifting spring via the operating handle. In contrast to the prior art, however, it is not necessary to provide a device for detecting the load condition of the lower luggage compartment element. This allows to realize the embodiment of the luggage compartment with a much simpler design. In addition, considerable weight advantages can be achieved. In the holding position, the holding force of the retaining device is preferably adapted to hold the lower luggage compartment element in the open position independently (i. e. without manual support by the user) not only in the loaded state but also in the unloaded state, without pieces of luggage in the receiving space of the luggage compartment. This embodiment makes it possible to equip the luggage compartment with a stronger lifting spring as compared to the prior art, to support the closing process. Contrary to the prior art, it is not necessary to adapt the lifting spring between the upper and lower luggage compartment elements to the unloaded state of the luggage compartment, to thus prevent any accidental closing of the luggage compartment in the unloaded state of the lower luggage compartment element. In contrast, the lower luggage compartment element can be held in the open position against the force of the lifting spring by means of the retaining device. The invention also has the advantage over the prior art in that the holding force exerted by the retaining device in the open position does not have to be overcome at least not exclusively by manually moving the lower luggage compartment element in the direction of the closed position. To initiate the closing process, the operating handle can be moved between a first position and a second position in order to move the retaining device from the holding position to the release position. Preferably, the operating handle is connected to a spring in such a way that the operating handle automatically returns to its first position after being actuated by the spring. Advantageously, the movement of the operating handle from the first position to the second position is different from the movement of the lower luggage compartment element. This means that, unlike in the prior art, the operation of the retaining device is not only achieved by swiveling the lower luggage compartment element upwards. According to the invention, the retaining device can be moved to the release position independently of the movement of the lower luggage compartment element. Therefore, advantageously, the release of the second holding device and the movement, in particular swiveling, of the lower luggage compartment element into the closed position may be decoupled from one another. This makes it much more convenient to actuate the luggage compartment. The operating handle is preferably located on a front or visible side of the lower luggage compartment element to facilitate operation by a user.

For the purpose of the present disclosure, specifications in terms of location and direction, i. e. "above", "below" etc. refer to the intended operating condition of the overhead luggage compartment installed in the aircraft.

In accordance with a particularly preferred embodiment, the operating handle is also arranged to release the holding device in the closed position of the lower luggage compartment element. In this embodiment, therefore, the same operation handle for the holding device is provided to fix the lower luggage compartment element in the closed position and for the retaining device to selectively release the lifting spring in the open position. By means of the operating handle therefore both the holding device and the retaining device can be actuated. For this purpose, the operating handle can be connected to both the holding device and the retaining device by means of a force transmission device. The advantage of this embodiment is that the operation of the luggage compartment is particularly simple and intuitive. Furthermore, an embodiment which is simple to construct can be provided, which distinguishes itself by low costs and weight savings.

The holding device comprises in particular a stop element, which is preferably located on the bottom side of the side panel of the upper luggage compartment element. A striker pin can be used as a stop element. Furthermore, the holding device may also have a hook means comprising preferably two cooperating hooks, which is arranged in particular on the side wall of the lower luggage compartment element. Of course, the stop element can also be arranged on the side wall of the lower luggage compartment element and the hook system can be arranged on the side panel of the upper luggage compartment element. In the closed position of the lower luggage compartment element, the hook device is locked with the stop element.

For actuating the first or second holding device, it is favorable if a pivoting handle is provided as an operating handle, which is preferably located on the front side of the lower luggage compartment element, in particular essentially centrally between two side walls of the lower luggage compartment element. To switch the retaining device from the active to the inactive state, the pivoting handle is swiveled.

According to another particularly preferred embodiment, the pivoting handle is designed to release the retaining device in the open position of the lower luggage compartment element by swiveling the pivoting handle by a first pivot angle and, in the closed position of the lower luggage compartment element, by swiveling the pivoting handle by a second pivot angle, the second pivot angle being smaller than the first pivot angle. Accordingly, the first pivot angle of the operating handle for the release of the retaining device in the open position is greater than the second pivot angle for the release of the holding device in the closed position of the lower luggage compartment element. This allows for a particularly intuitive operation of the luggage compartment, because different movements are provided for the various functions of the operating handle.

It is particularly preferred when the pivoting handle is pivotable against the force of at least one spring by the first, larger pivot angle or by the second, smaller pivot angle from a non-actuated rest position.

According to a particularly preferred embodiment, a larger manual force is required for swiveling the pivoting handle by the first pivot angle than for swiveling the pivoting handle by the second pivot angle.

In order to avoid unintentional release of the lifting spring by the user, it is preferred that the force characteristic curve for actuating the pivoting handle between the second pivot angle and the first pivot angle is progressive at least in sections, i. e. increases more than linearly.

According to another particularly preferred embodiment, the lower luggage compartment element is movable from the closed position to the open position by a first distance in the non-tensioned state of the lifting spring and by a second distance against the force of the lifting spring, the first distance of the lower luggage compartment element being smaller than the second distance of the lower luggage compartment element. Accordingly, the lifting spring in this embodiment is mounted on the luggage compartment in such a way that the lifting spring is held in a non-tensioned state when the lower luggage compartment element is moved from the closed position by the first distance to an intermediate position. When the lower luggage compartment element moves from the intermediate position to the open position, the lifting spring is tensioned. The advantage of this embodiment is that the lower luggage compartment element can be grasped in the partially open intermediate position to pull the lower luggage compartment element into the open position against the force of the lifting spring. This means that the overhead luggage compartment is particularly easy and convenient to operate. If the lifting spring is in the tensioned state in the closed position, because the closing process was carried out without the support of the lifting spring, the lower luggage compartment element can be moved directly from the closed position to the open position.

For the purpose of the present disclosure, the "tensioned state" of the lifting spring refers to the fact that a larger spring energy is stored than in the "non-tensioned state" of the lifting spring. However, the lifting spring is preferably slightly tensioned even in the non-tensioned state.

In order to switch the lower luggage compartment element to the open position in a simple and comfortable manner, it is favorable if the lower luggage compartment element when in the state where it has been moved by the first distance, an opening gap of 1 to 4 cm, preferably essentially 3 cm, is formed between the adjacent front edges of the upper and lower luggage compartment element. The opening gap of the overhead luggage compartment in the intermediate position is designed such that the user may engage between the front edges of the lower or upper luggage compartment elements, which front edges are positioned at a distance from each other, to manually pull the lower luggage compartment element into the open position in the unloaded state.

In order to be able to hold the luggage compartment element securely in the open position even in the unloaded state, it is of advantage if the retaining device comprises a first and a second locking element, which can be locked with each other in the open position of the lower luggage compartment element in the tensioned state of the lifting spring, wherein the locking of the first and second locking element can be released by actuation of the operating handle. When the locking elements are locked, the lifting spring is locked in the tensioned state. Preferably, the first locking element engages with the second locking element in a locking manner substantially upon reaching the open position, when the lifting spring is tensioned, starting from the non-tensioned state in the closed position of the lower luggage compartment element when being moved into the open position. Advantageously, the lower luggage compartment element is automatically held in the open position not only when loaded but also when unloaded. The first and second locking element are disengaged by actuating the operating handle, so that the spring force of the lifting spring is released. Thus, the lower luggage compartment can be moved to the closed position with the aid of the lifting spring. Alternatively, the closing process can be carried out in the blocked state of the lifting spring, i. e. without the support of the lifting spring. For this purpose, the lower luggage compartment element is moved from the open to the closed position without first releasing the retaining device via the operating handle.

According to a particularly preferred embodiment, a housing element for receiving the lifting spring and a piston element movable relative to the housing element are provided for tensioning the lifting spring. Advantageously, the lifting spring is protected by the arrangement in the housing element, additionally avoiding the risk of injury for the user. The lifting spring provided is preferably a coil spring, in particular a helical compression spring. The helical compression spring is compressed by means of the piston element when the lower luggage compartment element is moved to the open position. Alternatively, however, the lifting spring can also be realized by a gas pressure spring. In the released state of the retaining device, the stored energy of the lifting spring can be used to facilitate the closing process for the user when closing the overhead luggage compartment.

The housing element is preferably connected to the upper luggage compartment element and the piston element to the lower luggage compartment element. Vice versa, the housing element can also be connected to the lower luggage compartment element and the piston element to the upper luggage compartment element. In both cases, the lifting spring is positioned on the luggage compartment in such a way that the movement of the lower luggage compartment element is converted into a corresponding displacement of the piston element relative to the housing element.

In order to be able to supplement the inventive functionality with as few adaptations as possible in conventional embodiments of overhead luggage compartments, it is advantageous if the retaining device is arranged at least partly inside the housing element. Preferably, the retaining device is located entirely inside the housing element for the lifting spring. The advantage of this embodiment is that the retaining device and the lifting spring can be integrated in one component. In addition, assembly of the overhead luggage compartment can be made easier. Furthermore, the weight of the overhead luggage compartment can be reduced.

To block the lifting spring in the tensioned state when the open position of the lower luggage compartment element has been reached, it is favorable if the first locking element of the retaining device is connected to a piston rod of the piston element. Upon switching the luggage compartment to the open position, the piston element is moved in relation to the housing element. The first locking element is mounted on the piston rod of the piston element in such a way that the first locking element in the open position of the lower luggage compartment element engages with the second locking element, provided that the first and second locking elements have not engaged with each other already.

According to a particularly preferred embodiment, the lifting spring is arranged between a piston of the piston element and a counter bearing element, wherein the counter bearing element is relocatably arranged in the housing element in accordance with the first distance. Due to the dead weight of the lower luggage compartment element in the unloaded state, the lower luggage compartment element is lowered from the closed position to the partially open intermediate position, wherein the lifting spring remains in the non-tensioned state, i. e. the weaker or non-tensioned state compared to the tensioned state. The counter bearing element is shifted relative to the housing element between the closed position and the intermediate position. In the intermediate position, the counter bearing element impinges on the housing element, so that a further displacement of the counter bearing element is blocked. When the lower luggage compartment element moves in the direction of the open position, the lifting spring is tensioned via the piston, while the counter bearing element is immovably in contact with the housing element.

In order to arrange the retaining device when reaching the open position in the locked state, it is favorable if the counter bearing element comprises the second locking element, in particular a locking recess, for locking with the first locking element on the piston rod of the piston element.

To transmit a manual force applied on the operating handle to the retention device for the lifting spring, it is favorable if the operating handle is connected to the retaining device via a release device.

In particular in an embodiment where the operating handle is designed as a pivot handle, it is favorable when the release device comprises a rotating shaft coupled to the operating handle. The swiveling movement of the pivoting handle is transmitted to the rotating shaft connected thereto in a torque-proof manner, which preferably extends in longitudinal direction of the lower luggage compartment element from the pivoting handle to a side wall of the lower luggage compartment element. As an alternative or in addition to the rotating shaft, a cable pull mechanism may be provided.

To absorb the rotary movement of the rotating shaft, it is favorable when the release device comprises an operating lever connected to the rotating shaft and to the retaining device. Accordingly, the rotary movement of the rotating shaft can be converted into a pivoting of the operating lever, which is preferably arranged on a side wall of the lower luggage compartment element. The pivoting of the operating lever, on the one hand, can be used to release the retaining device in the closed position of the lower luggage compartment element and, on the other hand, to release the retaining device in the open position of the lower luggage compartment element.

To release the retaining device, it is advantageous if the first locking element comprises at least one locking leg pivotable by the release device, wherein preferably two locking legs supported about a common pivot axis are provided. Preferably, the at least one locking leg comprises a locking projection, which in the locked state is interlocked with a corresponding locking groove of the second locking element. In order to activate the spring support, the operator can actuate the operating handle in the open position of the lower luggage compartment element. In this way, the at least one locking leg is swiveled to such an extent that the locking engagement with the second locking element is released. In the unlocked state of the retaining device, the lifting spring is unbent during the closing process so that the manual force required to overcome the weight of the (loaded) luggage compartment element is reduced accordingly.

To be able to precisely release the retaining device for the lifting spring, the retaining device preferably comprises a cable pull and an expanding wedge, which is connected to the cable pull and can be pushed against the force of a spring, which wedge is located between the locking legs of the first locking element in the locked state. Due to the arrangement of the expanding wedge between the two locking legs of the first locking element, the lifting spring is fixed in the tensioned state. In order to release the spring force for supporting the closing process, the expanding wedge can be shifted by means of the cable pull to such an extent that the locking engagement of the retaining device is released.

To release the locking of the retaining device via the cable pull, it is of advantage if the locking legs are connected to another spring, in particular a leg spring, with which the locking legs are biased in the direction of the unlocked state. Due to the action of the additional spring, the locking engagement of the locking legs is automatically released as soon as the expanding wedge has been removed by means of the cable pull.

As is customary in the prior art, it is preferred to provide a damping element to dampen the movement of the lower luggage compartment element from the closed position to the open position. The damping element may be connected to the side wall of the lower luggage compartment element at one end and to the side panel of the upper luggage compartment element at the other end. In addition, the damping element is preferably designed to dampen the movement of the lower luggage compartment element from the open position in the direction of the closed position. On the one hand, the damping element thus serves the purpose of preventing the lower luggage compartment element from dropping abruptly when the lower luggage compartment element is opened in an unloaded state with the lifting spring blocked. On the other hand, the lower luggage compartment element is prevented from abruptly jolting up from the open position, if the retaining device is released in the unloaded state of the lower luggage compartment element.

In order to achieve a compact construction, it is favorable if the longitudinal axis of the damping element extends essentially parallel and at a distance from the longitudinal axis of the lifting spring. The damping element is preferably located adjacent to the lifting spring. According to an alternative embodiment variant, the lifting spring and the damping element are combined in a spring damper.

According to a particularly preferred embodiment, a side panel of the lower luggage compartment element is swivelably connected to a side panel of the upper luggage compartment element via a hinge joint. Preferably, the lower luggage compartment element comprises two side walls, each of which is arranged via a single hinge joint on the corresponding side panel of the upper, stationary luggage compartment element. This results in a single-jointed support of the lower luggage compartment element.

BRIEF DESCRIPTION OF THE FIGURES

Below, the invention will be explained by using a preferred exemplary embodiment and in reference to the drawing, but is not limited thereto.

DETAILED DESCRIPTION

Figure 1:
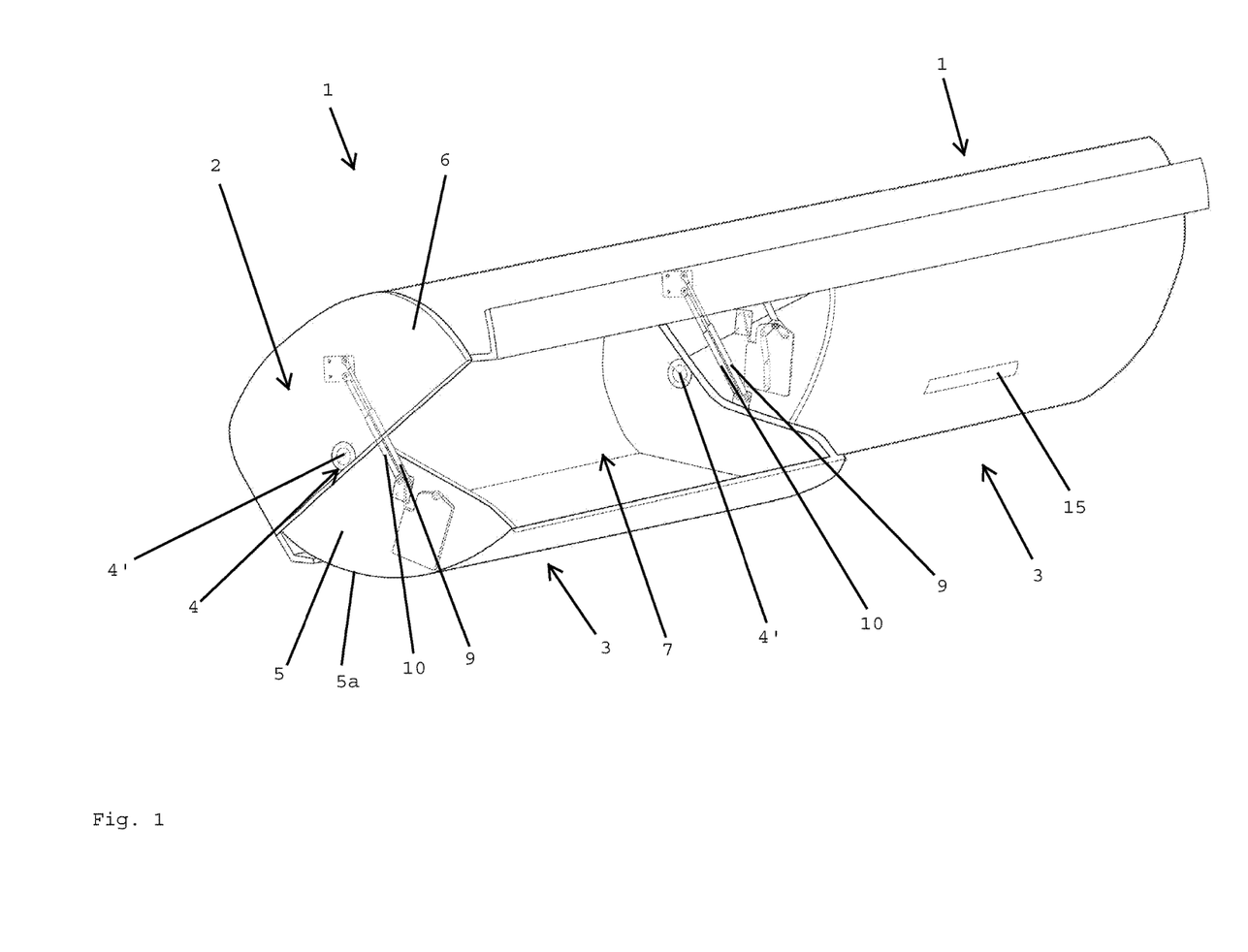
FIG. 1 depicts a diagrammatic view of an overhead luggage compartment according to the invention, comprising an upper luggage compartment element and two lower luggage compartment elements pivotable relative thereto, between which a lifting spring is arranged in support of the closing operation, wherein the one overhead luggage compartment is shown in the closed position, the other overhead luggage compartment is shown in the open position.

FIG. 1 shows an arrangement of overhead luggage compartments 1 for assembly in an aircraft (not shown). In the drawing, by way of example, two overhead luggage compartments 1 are arranged one next to the other. Usually, a plurality of similar overhead luggage compartments is provided.

Of course, one may also use a single overhead luggage compartment 1 only. The overhead luggage compartment 1 comprises a fixed or stationary upper luggage compartment element 2, which in the mounted operating state is mounted on a structure element, in particular a fuselage (not shown). In addition, the luggage compartment 1 comprises a movable lower luggage compartment element 3. The luggage compartment 1 comprises a longitudinal extension which in the built-in state is arranged in flight direction, i. e. in longitudinal direction of the aircraft. The movable luggage compartment element 3 is suspended on the stationary luggage compartment element 2 on both sides via hinge joints 4 comprising joint axes 4'. Accordingly, a single-axle suspension of the lower luggage compartment element is provided. The hinge joints 4 are located on overlapping sections of side walls 5 of the lower luggage compartment element 3 and side panels 6 of the upper luggage compartment element 2. The side walls 5 of the lower luggage compartment element 3 and the side panels 6 of the upper luggage compartment element 2 are each adapted to be essentially planar, wherein the side walls 5 of the lower luggage compartment element 3 are essentially parallel to the side panels 6 of the upper luggage compartment element 2. The side walls 5 of the lower luggage compartment element 3 stand up laterally from a floor 5a, so that the lower luggage compartment element 3 is designed as a trough, half chute or U-shaped luggage compartment for accommodating pieces of luggage. The lower luggage compartment element 3 can be pivoted between an open position (cf. the overhead luggage compartment 1 in FIG. 1, left), in which a loading opening 7 is exposed, and a closed position (cf. the overhead luggage compartment 1 in FIG. 1, right), in which the loading opening 7 is closed. For supporting the closing operation, a lifting spring 9 is arranged between the upper luggage compartment element 2 and the lower luggage compartment element 3, by means of which the closing operation is facilitated. For this purpose, the lifting spring 9 can, as will be explained in more detail below, be biased upon opening the luggage compartment 1 so that the stored spring energy is available upon closing of the luggage compartment 1. In addition, a damping element 10 is provided, by means of which the pivoting of the lower luggage compartment element 3 is damped. In the shown embodiment, the damping element 10 is designed as an oil damper in a manner known per se. Of course, however, other damping media may also be used. In the shown embodiment, the longitudinal axis of the damping element 10 extends essentially parallel and at a distance from the longitudinal axis of the lifting spring 9.

As can be further seen from FIGS. 1 to 4, the luggage compartment 1 comprises a holding device 11 for fixing the lower luggage compartment element 3 in its closed position, in which the loading opening 7 is completely closed. The holding device 11 comprises a stop element 12 which is arranged immovably on the bottom side of the side panel 6 of the upper luggage compartment element 2. A striker pin is provided as stop element 12. In addition, the holding device 11 comprises a hook means 13 with two cooperating hooks 14, which is arranged on the side wall 5 of the lower luggage compartment element 3 in the shown embodiment. In the closed position of the lower luggage compartment element 3 (cf. FIG. 2) the hook means 13 is locked with the stop element 12. To release the holding device 11, the lower luggage compartment element 3 comprises an operating handle 15 on the front or visible side. The stop element 12 of the holding device 11 can be released from the engagement of the hook means 13 via the operating handle 15, so that the lower luggage compartment element can be moved in the direction of the open position.

In the shown embodiment, the overhead luggage compartment 1 additionally comprises a retaining device 16 (cf. FIGS. 7 to 11) for fixing or blocking the lifting spring 9 in the tensioned state. The retaining device 16 is adapted to hold the lifting spring 9 in the tensioned state until the user releases the effect of the lifting spring 9. For this purpose, the retaining device 16 is connected to the operating handle 15 which is preferably manually operable. In the open position of the lower luggage compartment element 3, the retaining device 16 can be switched to a release position via the operating handle 15, in which the fixing of the lifting spring 9 in the tensioned state is removed. In this case, the lower luggage compartment element 3 can be swiveled upwards with the help of the lifting spring 9. During the next opening process the lifting spring 9 is tensioned again. Without releasing the retaining device 16 via the operating handle 15 the lifting spring 9 will remain in the tensioned state when being switched from the open position to the closed position, so that the lower luggage compartment element 3 can be lifted without the assistance of a spring.

In the shown embodiment, corresponding lifting springs 9, damping elements 10, retaining devices 16 and holding devices 11 are provided on opposite sides of the luggage compartment 1. For the sake of simplicity, the description of the Figures refers to only one side of the luggage compartment 1. Said illustrations analogously apply to the other side of the luggage compartment 1. Generally, the cited devices might also be provided only on one side of the lower luggage compartment element 3.

Figure 2:
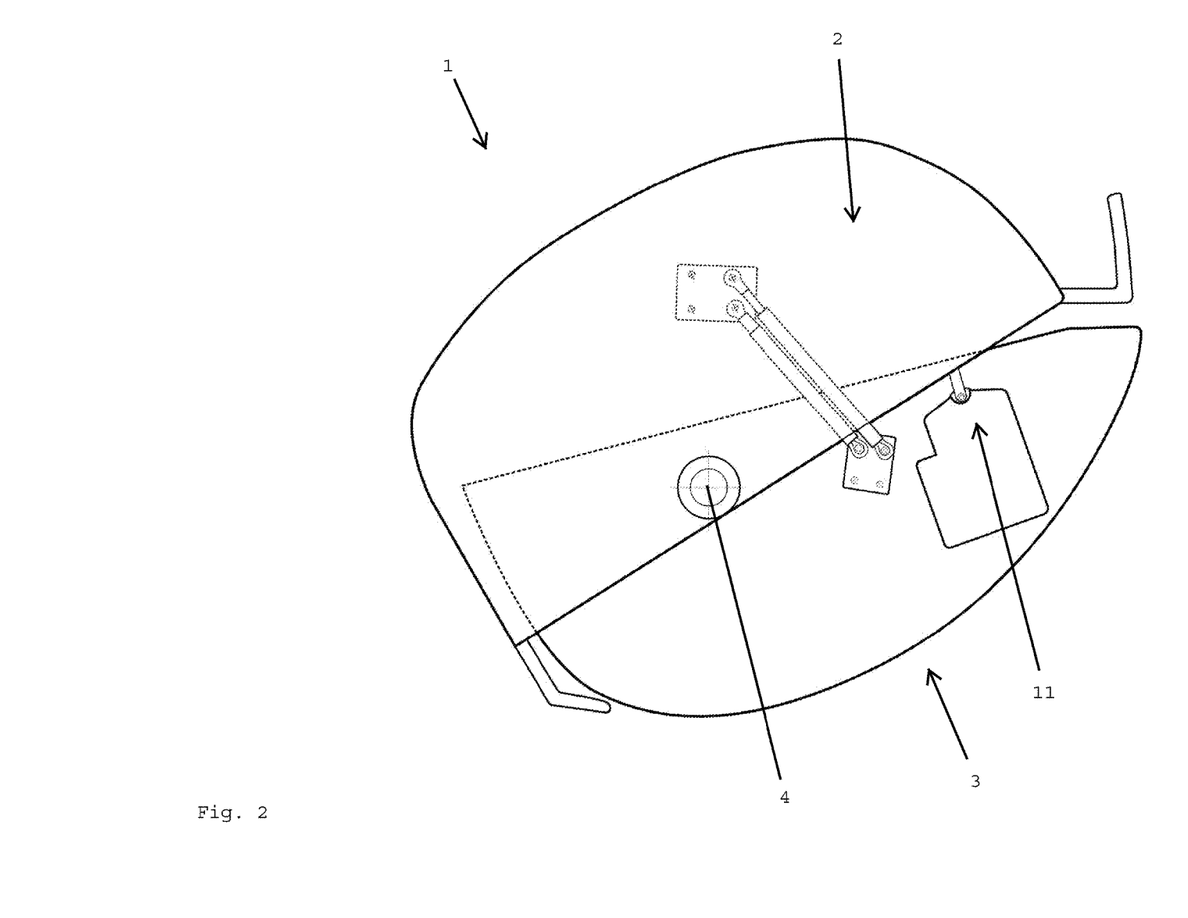
FIG. 2 depicts a side view of the overhead luggage compartment container according to FIG. 1 in the closed position, in which the lower luggage compartment element is held by means of a holding device on the upper luggage compartment element.
Figure 3:
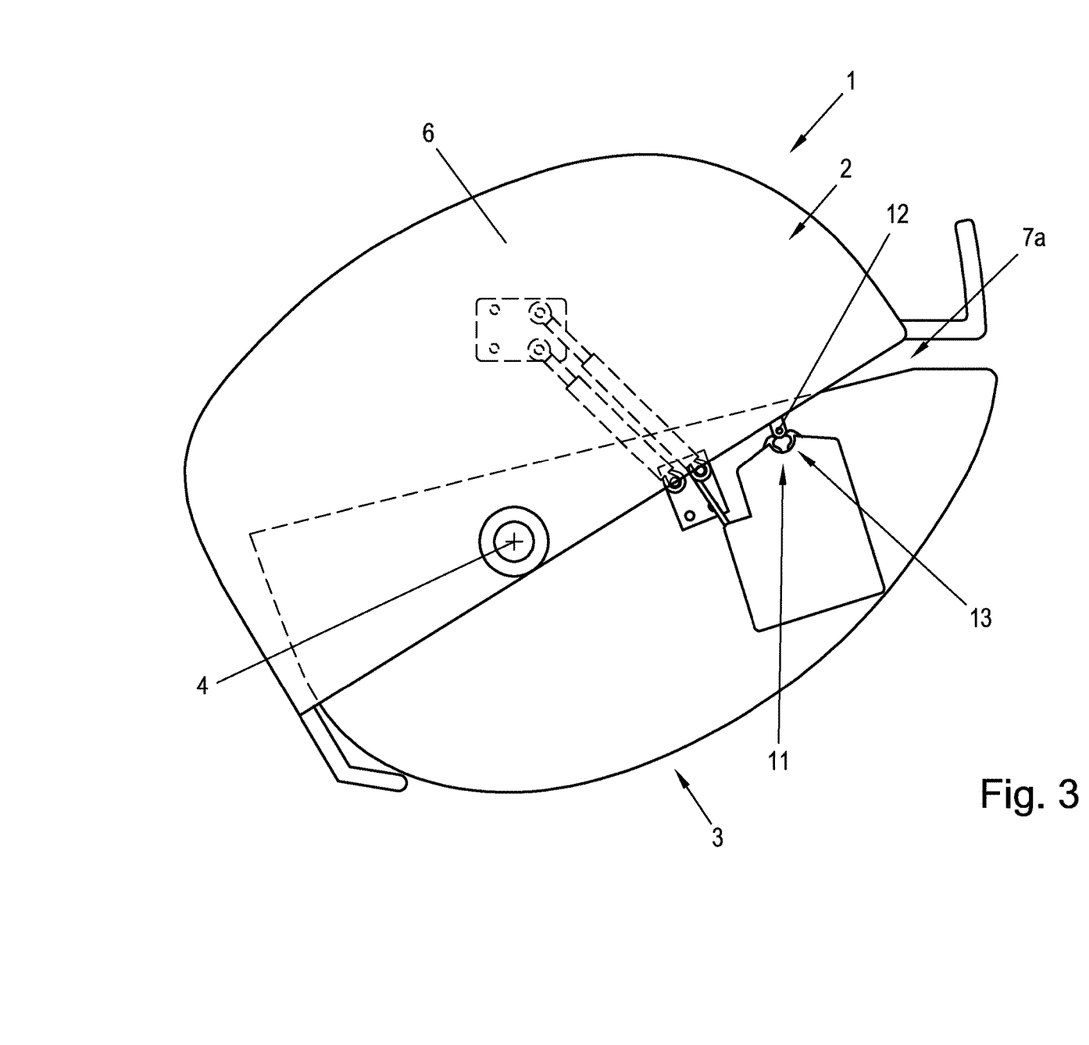
FIG. 3 depicts a side view of the overhead luggage compartment container according to FIG. 1 in an intermediate position forming an opening gap, from which the lower luggage compartment element can be pulled manually into the open position in the unloaded state.
Figure 4:
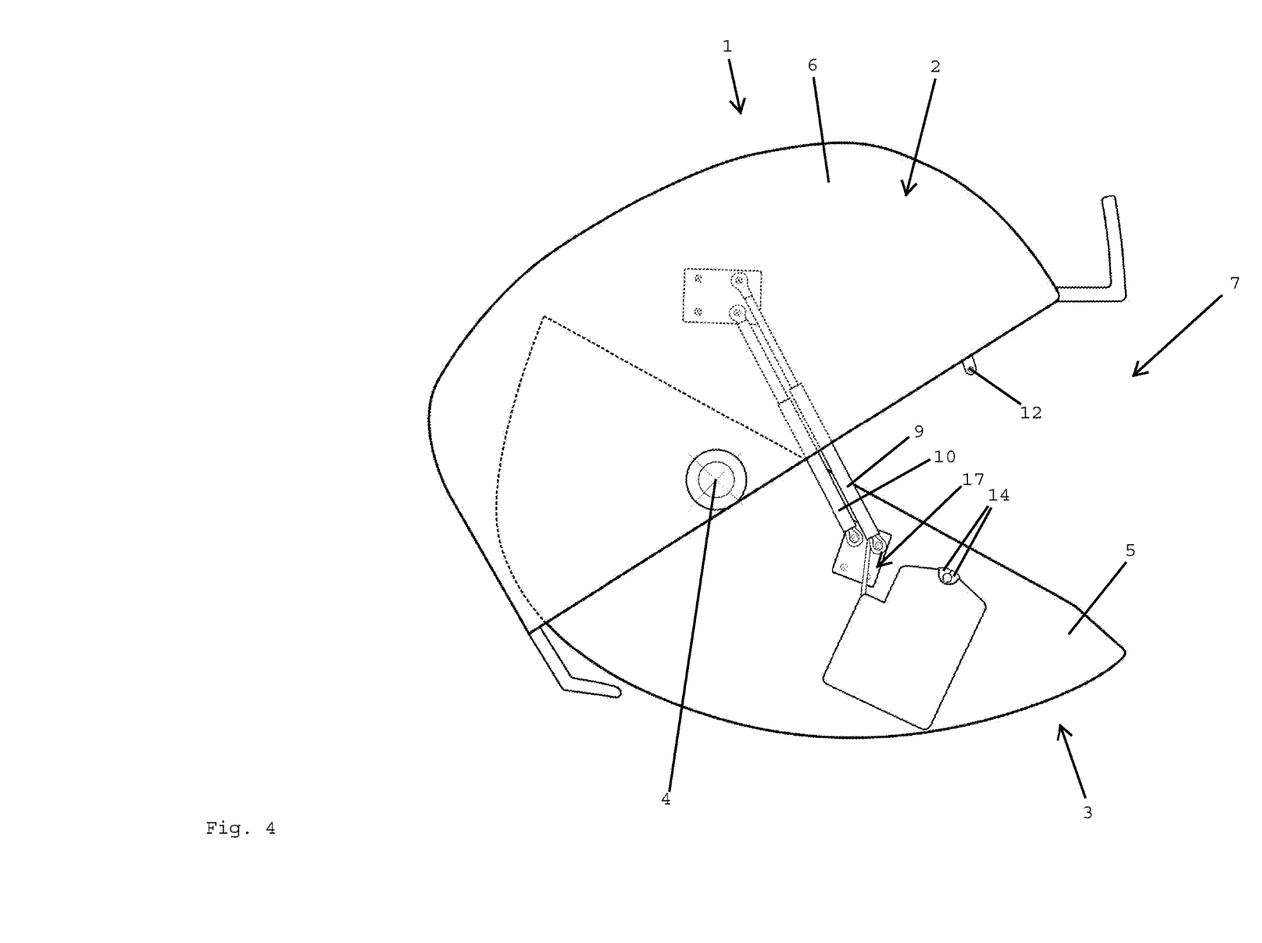
FIG. 4 depicts a side view of the overhead luggage compartment container according to FIG. 1 in the open position, wherein the lifting spring is blocked by means of a retaining device in the tensioned state, until a pivoting handle on the front side of the lower luggage compartment element is actuated.

According to FIG. 2 the lower luggage compartment element 3 is arranged in the closed position, in which the lower luggage compartment element 3 is held by means of the holding device 11 on the upper luggage compartment element 2. When the closing operation is initiated in the non-tensioned state of the lifting spring 9 and the lower luggage compartment element 3 is in the unloaded state, the release of the holding device 11 via the operating handle 15 causes that the lower luggage compartment element 3 is moved automatically into an intermediate position shown in FIG. 3. In the intermediate position according to FIG. 3 an opening gap 7a between adjacent front edges of the upper 2 and the lower luggage compartment element 3 is formed. The opening gap 7a has a height of 1 to 4 cm, preferably essentially 3 cm. The user may engage in the opening gap 7a, to pull the lower luggage compartment element 3 against the force of the lifting spring 9 into the open position according to FIG. 4. In the open position of the lower luggage compartment element 3 the lifting spring 9 is in the tensioned state. Accordingly, the lower luggage compartment element 3 is swiveled from the closed position into the open position, initially by a first distance in the non-tensioned state of the lifting spring 9 and subsequently by a second distance against the force of the lifting spring 9. The first distance of the lower luggage compartment element 3 is smaller than the second distance of the lower luggage compartment element 3, so that in the intermediate position of the lower luggage compartment element 3 the opening gap 7a is formed. When the closing process with the lifting spring 9 being fixed in the tensioned state is initiated, the lower luggage compartment element 3 can be lowered directly from the closed position into the open position in the unloaded state.

In the shown embodiment, one and the same operating handle 15 is provided for actuating the holding device 11 and the retaining device 16. The user can actuate the operating handle 15 in the closed position of the lower luggage compartment element 3 to initiate the opening process by releasing the holding device 11. On the other hand, the operating handle 15 can be actuated in the open position to release the lifting spring 9 for the closing operation. For this purpose, the operating handle 15 is connected to a release device 17, by means of which, on the one hand, the holding device 11 and, on the other hand, the retaining device 16 can be released. In the open position of the luggage compartment 1, the operating handle 15 can be moved between a first position and a second position to move the retaining device 16 from a holding position to a release position. In the closed position of the luggage compartment 1 the operating handle 15 can be moved between a first position and a third position to switch the holding device 11 from the holding position, in which the lower luggage compartment element 3 is automatically held in the closed position, to a release position, in which the lower luggage compartment element 3 can be pivoted into the open position. Preferably, the second position of the operating handle 15 is different from its third position, so that the various functions of the operating handle 15 are realized by different positions. In the holding position, the retaining device 16 is designed to automatically hold the lower luggage compartment element 3 against the effect of the lifting spring 9 in the open position. In the release position of the retaining device 16, the lower luggage compartment element 3 can be swiveled into the open position by applying a comparably low actuating force.

As can be seen from FIGS. 1 to 6, the operating handle 15 provided is a pivoting handle, which for actuating the holding device 11 or the retaining device 16 can be pivoted about a pivot axis extending in flight direction. To release the retaining device 16 in the open position, it is necessary to swivel the operating handle 15 by a first, larger pivot angle, which is for example 25°. To release the holding device 11 in the closed position, it is sufficient to swivel the operating handle 15 by a second, smaller pivot angle, which is for example 15°. To avoid faulty operation, swiveling of the pivoting handle is subject to a noticeable increase of the resistance between the second, smaller pivot angle and the first, larger pivot angle.

Figure 5:
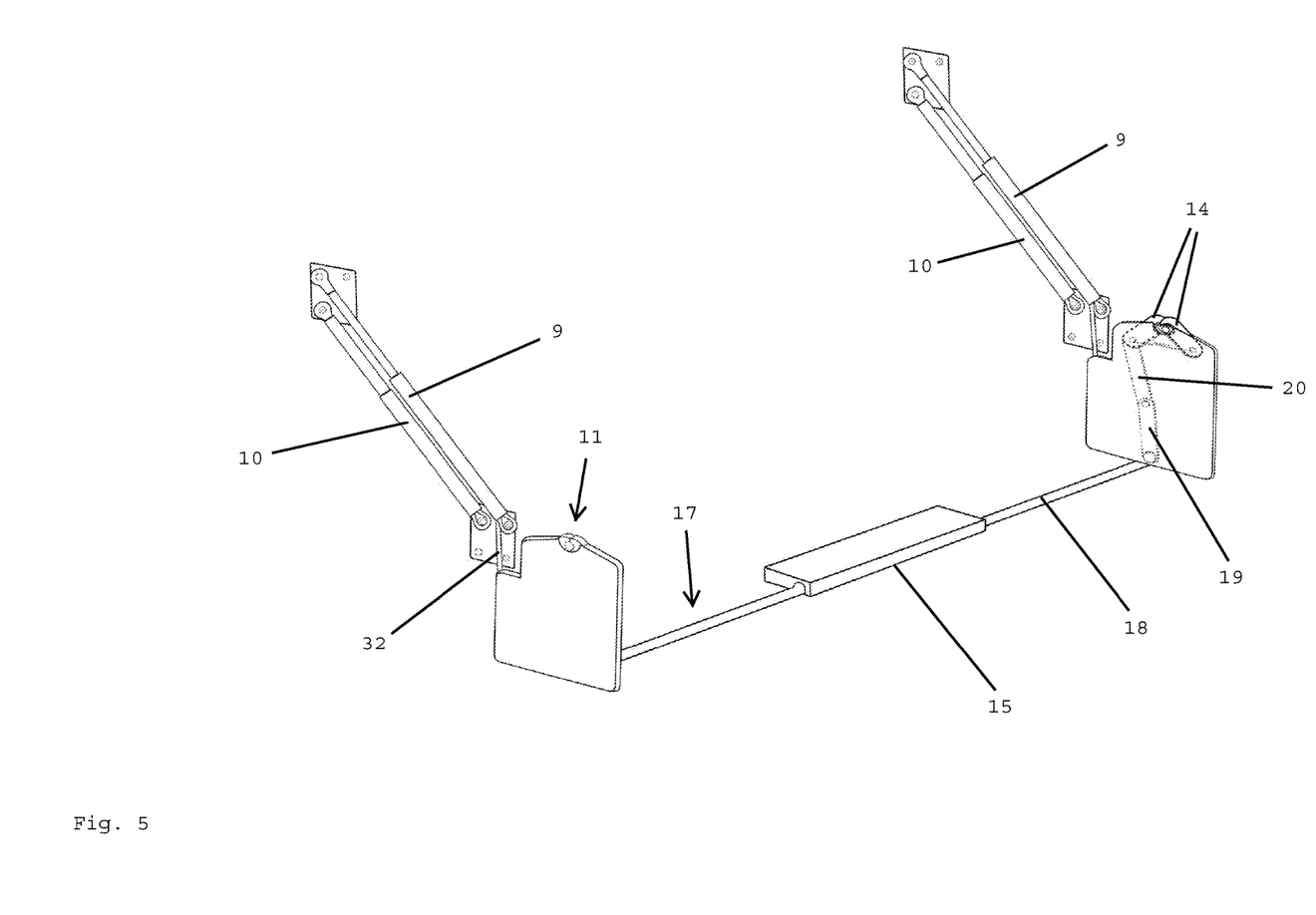
FIG. 5 depicts a diagrammatic view of parts of the luggage compartment according to FIGS. 1 to 4 for illustrating the force transmission from the pivoting handle to the holding device for the closed position of the lower luggage compartment element and the retaining device for the open position of the lower luggage compartment element.
Figure 6:
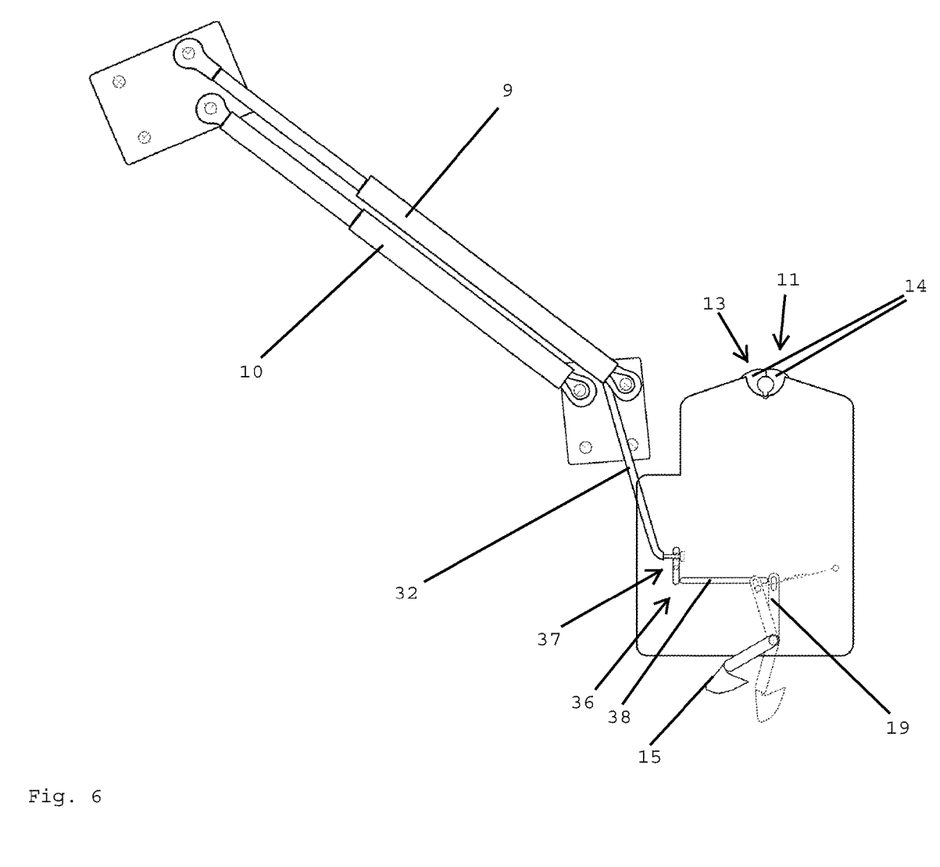
FIG. 6 depicts a side view according to FIG. 5.

As can be seen from FIGS. 5, 6, the retaining device 17 comprises a rotating shaft 18 coupled to the pivoting handle 15 in a torque-proof manner, which rotating shaft extends from the pivoting handle in a longitudinal direction of the luggage compartment 1 to the side wall 5 of the lower luggage compartment element 3. The rotating shaft 18 is connected to an operating lever 19 in a torque-proof manner, by means of which, on the one hand, the holding device 11 and, on the other hand, the retaining device 16 are actuated. The hook means 13 of the holding device 11 is connected to the operating lever 19 via a pivotable reversing lever 20, which operating lever 19 is swiveled by actuating the pivoting handle. The swiveling of the operating lever 19 is converted into a contra-directional swiveling of the reversing lever 20 against the force of the spring (not shown), whereby in the closed position the stop element 12 can be released by the hooks 14.

As can be further seen from FIGS. 5, 6, the release device 17 additionally comprises a cable pull 32, by means of which a tensile force can be applied on the retaining device 16, to bring it into the release position. For transmitting the swiveling movement of the operating lever 19 to the cable pull 32, a deflector element 36 is provided between the operating lever 19 and the cable pull 32. The deflector element 36 comprises a pivotally supported pivot pin 37, wherein the cable pull 32 is attached on one end of the pivot pin 37. A journal 38 engages on the other end of the pivot pin 37, which can be moved by means of the free end of the operating lever 19.

As shown in FIGS. 7 to 11, the retaining device 16 comprises a first locking element 21 and a second locking element 22. In the open position of the lower luggage compartment element 3, in the tensioned state of the lifting spring 9 (cf. FIG. 9), the first locking element 21 is locked with the second locking element 22, so that the lifting spring 9 is blocked in the tensioned state. The locking of the first 21 and second locking element 22 can be released by actuating the operating handle 15, as explained below in more detail.

A cylinder-piston element 23 is provided in the embodiment shown here, which comprises an in particular cylindrical housing element 24 for receiving the lifting spring 9 and a piston element 25 which is slidably mounted therein for tensioning the lifting spring 9. The piston element 25 comprises a piston 26 which abuts on the one end of the lifting spring 9. In addition, the piston element 25 comprises a piston rod 27 which penetrates the lifting spring 9 centrally. In the embodiment shown, a helical compression spring is provided as lifting spring 9. By moving the piston element 25 relative to the housing element 24, the lifting spring 9 can be compressed. In the open position, the lifting spring 9 is always in a tensioned state. The housing element 24 comprises a first fastening element 28 which is preferably attached to the side wall 5 of the lower luggage compartment element 3. The piston rod 27 of the piston element 25 is connected to a second fastening element 29, which is preferably attached to the side panel 6 of the upper luggage compartment element 2. This converts the swiveling of the lower luggage compartment element 3 into a displacement of the piston element 25 relative to the housing element 24.

In the embodiment shown, the retaining device 16 is arranged completely inside the housing element 24. The first locking element 21 of the retaining device 16 is connected to the piston rod 27 of the piston element 25. The second locking element 22 is formed on a counter bearing element 30, which rests against the other end of the lifting spring 9 opposite the piston 26. In the shown embodiment, the counter bearing element 30 is formed by a bearing disk with a central opening for passage of the piston rod 27. The lifting spring 9 is located between the piston 26 of the piston element 25 and the counter bearing element 30. Starting from the closed position of the lower luggage compartment element 3 shown in FIG. 7, the counter bearing element 30 is mounted so that it can slide within the housing element 24 by a distance, which corresponds to a first distance of the lower luggage compartment element 3 between the closed position of the lower luggage compartment element 3 (cf. FIG. 2) and its intermediate position (cf. FIG. 3).

In the shown embodiment, the first locking element 21 comprises two locking legs 31 mounted about a common pivot axis, which can be removed from the locking engagement with the second locking element 22 by swiveling the operation handle 15. For this purpose, the release device 17 comprises an expanding wedge 34 which is connected to the cable pull 32 and can be moved against the force of a spring 33, which in the locked position is arranged between the locking legs 31 of the first locking element 21. The locking legs 31 of the first locking element 21 are connected to another spring (not shown), that is a leg spring, with which the locking legs 31 are biased in the direction of the unlocked state.

FIGS. 7 to 11 show the various conditions and operating modes of the luggage compartment 1.

Figure 7:
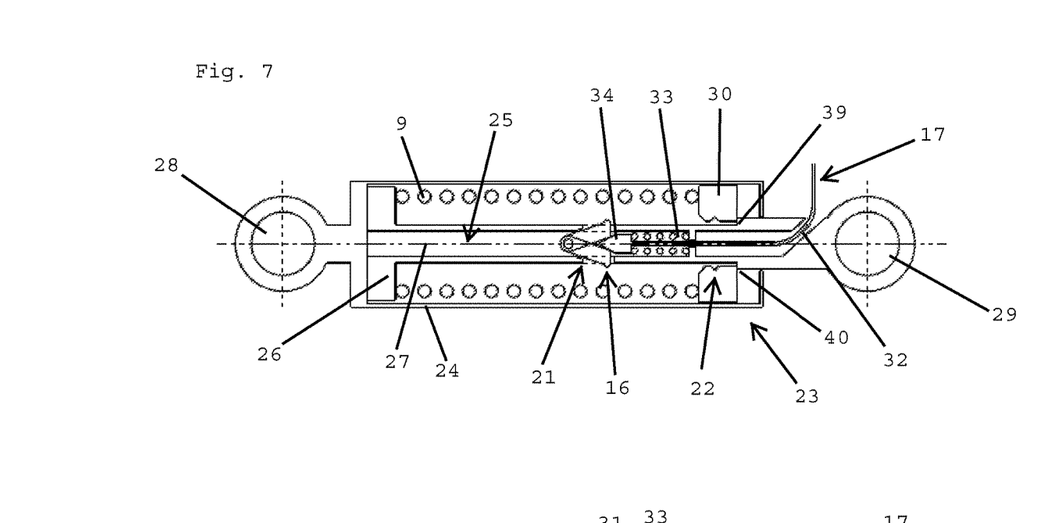
FIGS. 7 to 11 depict cross-sectional views of a cylinder-piston element receiving the lifting spring, in the various positions and possible uses of the luggage compartment element.

According to FIG. 7, the lower luggage compartment element 3 is arranged in the closed position, the lifting spring 9 being in the non-tensioned state.

Figure 8:
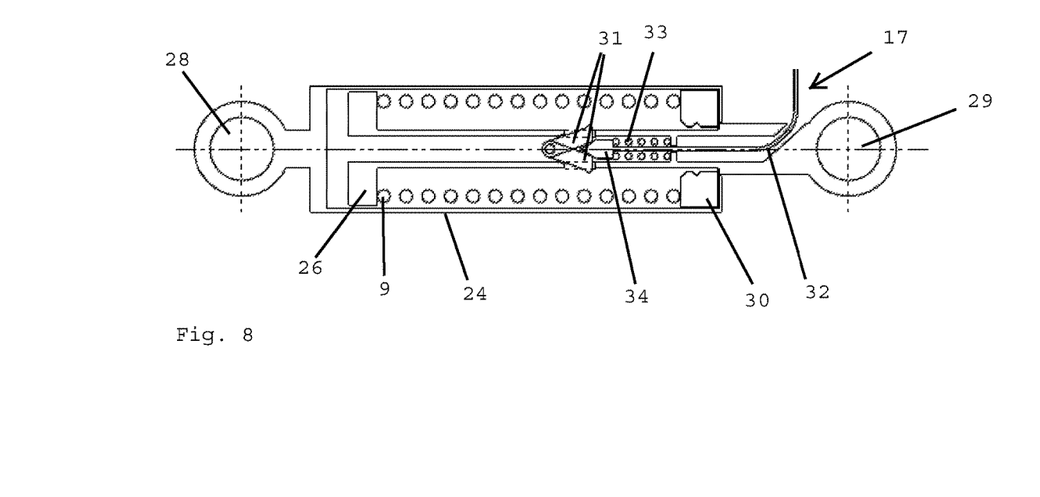

In accordance with FIG. 8, the lower luggage compartment element 3 was arranged in the intermediate position by releasing the holding device 11, in which intermediate position the opening gap 7a is formed for pulling open the lower luggage compartment element 3. The lifting spring 9 is preferably arranged between the closed position and the intermediate position in a slightly tensioned state compared to the open position, which makes it easier to compensate vibrations in the intermediate position. For this purpose, the piston rod 27 and the counter bearing element 30 comprise corresponding stops 39, 40 which hold the lifting springs 9 between the closing and opening positions in a slightly tensioned state.

Figure 9:
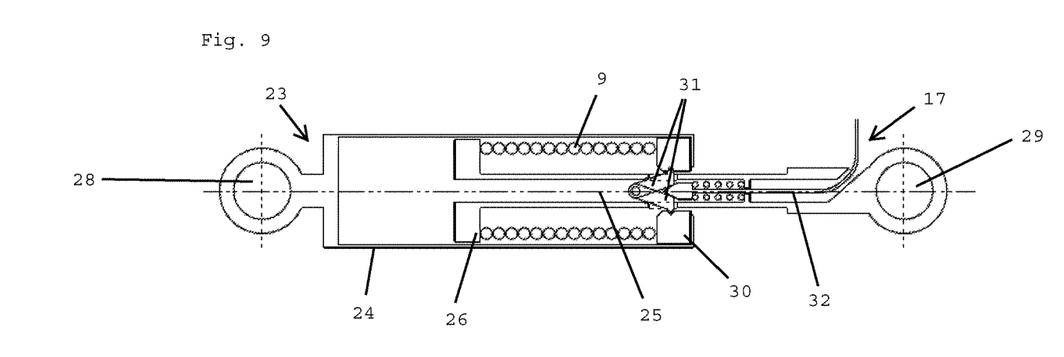

According to FIG. 9, the lower luggage compartment element 3 is pivoted into the open position, wherein the lifting spring 9 has been switched into the tensioned state. Upon reaching the open position, the locking connection between the first locking element 21 and the second locking element 22 is established, so that the lifting spring 9 is blocked in the tensioned state.

Figure 10:
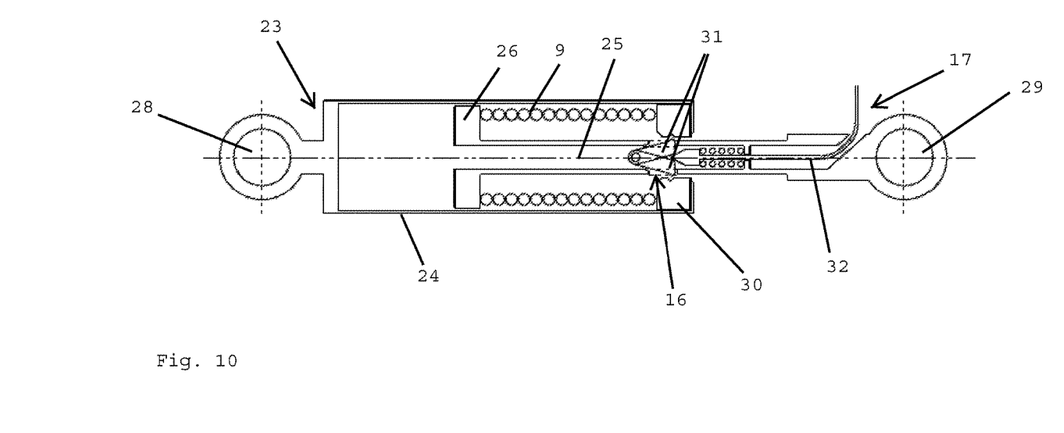

According to FIG. 10, the operating handle 15 is actuated to release the retaining device 16. The movement of the operating handle 15 is transmitted via the release device 17 to the retaining device 16, so that the lifting spring 9 is released when the lower luggage compartment element 3 is swiveled upwards.

Figure 11:
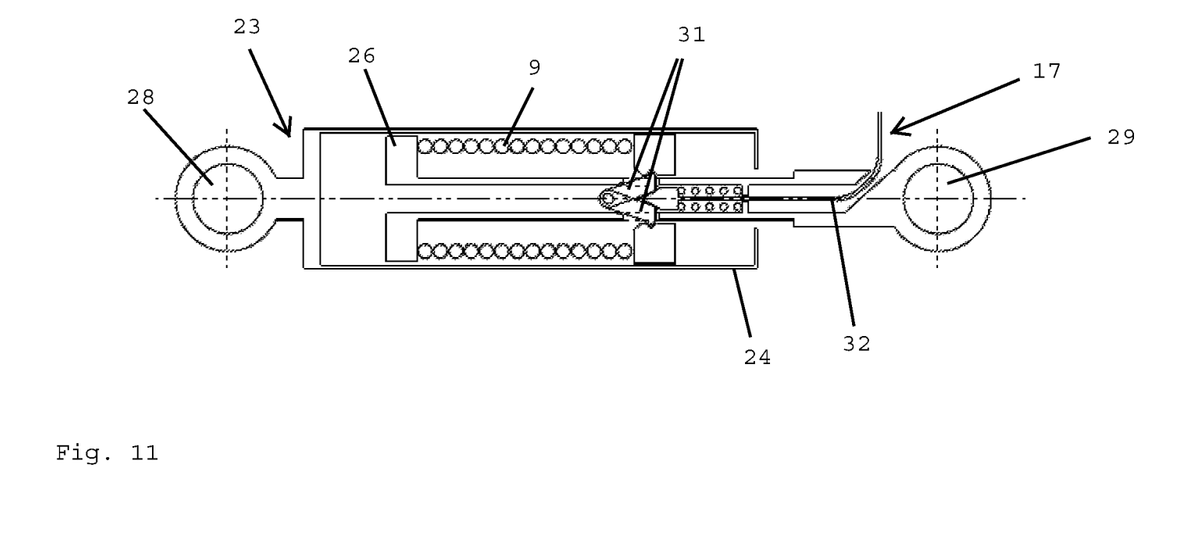

FIG. 11 shows an alternative possible use of the luggage compartment 1, in which the lower luggage compartment element 3, in the tensioned state of the lifting spring 9, that is with active retaining device 16, is swiveled in the direction of the closed position. In this case, the closing process is carried out without spring support. The lifting spring 9 is then in the closed position in the tensioned state. The opening process can be initiated again via the operating handle 15. Since the lifting spring 9 is already in the tensioned state, the lower luggage compartment element 3 can be moved directly from the closed position to the open position. In the open position, the user may choose whether the next closing operation is to be carried out with or without spring support.

The invention claimed is:

1. An overhead luggage compartment for an aircraft, comprising:
    an upper luggage compartment element, a lower luggage compartment element which is movable between an open position and a closed position, a holding device for holding the lower luggage compartment element in the closed position, a lifting spring for supporting movement of the lower luggage compartment element from the open position into the closed position, and a retaining device for fixing the lifting spring in a tensioned state in the open position of the lower luggage compartment element, wherein an operating handle is provided to release the retaining device in the open position of the lower luggage compartment element, wherein independently of a lower luggage compartment element load condition the lower luggage compartment element is movable, optionally with support by the lifting spring or with the lifting spring fixed in the tensioned state, from the open position toward the closed position.

2. The overhead luggage compartment according to claim 1, wherein the operating handle is further adapted for releasing the holding device in the closed position of the lower luggage compartment element.

3. The overhead luggage compartment according to claim 2, wherein a pivoting handle is provided as the operating handle, which is arranged on a front side of the lower luggage compartment element.

4. The overhead luggage compartment according to claim 3, wherein the pivoting handle is arranged to release, in the open position of the lower luggage compartment element, the retaining device by pivoting the pivoting handle by a first pivot angle and, in the closed position of the lower luggage compartment element, the holding device by pivoting the pivoting handle by a second pivot angle, wherein the second pivot angle is smaller than the first pivot angle.

5. The overhead luggage compartment according to claim 1, wherein the lower luggage compartment element is movable from the closed position to the open position by a first distance in a non-tensioned state of the lifting spring and by a second distance against a force of the lifting spring, the first distance of the lower luggage compartment element being smaller than the second distance of the lower luggage compartment element.

6. The overhead luggage compartment according to claim 5, wherein, when the lower luggage compartment element is in a state where it has been moved by the first distance, an opening gap of 1 to 4 cm is formed between adjacent front edges of the upper and lower luggage compartment elements.

7. The overhead luggage compartment according to claim 1, wherein the retaining device comprises a first and a second locking element, which can be locked with each other in the open position of the lower luggage compartment element, in the tensioned state of the lifting spring, wherein the locking of the first and second locking elements can be released by actuation of the operating handle.

8. The overhead luggage compartment according to claim 1, wherein a housing element for receiving the lifting spring and a piston element movable relative to the housing element for tensioning the lifting spring are provided for.

9. The overhead luggage compartment according to claim 8, wherein the retaining device is arranged at least partially inside the housing element.

10. The overhead luggage compartment according to claim 8, wherein a first locking element of the retaining device is connected to a piston rod of the piston element.

11. The overhead luggage compartment according to claim 8, wherein the lifting spring is arranged between a piston of the piston element and a counter bearing element, wherein the counter bearing element is movably arranged in accordance with a first distance in the housing element.

12. The overhead luggage compartment according to claim 11, wherein the counter bearing element comprises a second locking element, in particular a locking recess, for locking with a first locking element on a piston rod of the piston element.

13. The overhead luggage compartment according to claim 1, wherein the operating handle is connected to the retaining device via a release device.

14. The overhead luggage compartment according to claim 13, wherein the release device comprises a turning shaft coupled to the operating handle.

15. The overhead luggage compartment according to claim 14, wherein the release device comprises an operating lever connected to the turning shaft, which operating lever is connected to the holding device.

16. The overhead luggage compartment according to claim 7, wherein the first locking element comprises at least one locking leg pivotable by the release device.

17. The overhead luggage compartment according to claim 16, wherein the release device comprises a cable pull and an expanding wedge which is connected to the cable pull and is movable against a force of a spring, which expanding wedge is arranged between the locking legs of the first locking element in a locked state.

18. The overhead luggage compartment according to claim 16, wherein the locking legs are connected to another spring by means of which the locking legs are biased in a direction of an unlocked state.

19. The overhead luggage compartment according to claim 1, wherein a damping element is provided for damping movement of the lower luggage compartment element from the closed position to the open position, wherein a longitudinal axis of the damping element extends substantially parallel and at a distance from a longitudinal axis of the lifting spring.

20. The overhead luggage compartment according to claim 1, wherein a side wall of the lower luggage compartment element is pivotally connected to a side panel of the upper luggage compartment element via a hinge joint.

21. The aircraft comprising an overhead luggage compartment according to claim 1.

* * * * *